United States Patent
Annati et al.

(10) Patent No.: US 7,999,698 B2
(45) Date of Patent: Aug. 16, 2011

(54) ANTI-COLLISION LIGHTING SYSTEMS AND METHODS FOR A MICRO AERIAL VEHICLE

(75) Inventors: Richard E. Annati, Albuquerque, NM (US); David E. Ekhaguere, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 326 days.

(21) Appl. No.: 12/133,040

(22) Filed: Jun. 4, 2008

(65) Prior Publication Data

US 2009/0303081 A1    Dec. 10, 2009

(51) Int. Cl.
*G08B 21/00* (2006.01)
(52) U.S. Cl. ............ 340/945; 340/981; 340/982; 701/9; 362/470; 244/24
(58) Field of Classification Search .................. 340/945, 340/981, 982; 701/3, 9; 362/470; 244/24, 244/31; 446/46, 47; D21/441, 443, 447
See application file for complete search history.

(56) References Cited

U.S. PATENT DOCUMENTS

| | | | | |
|---|---|---|---|---|
| 4,307,538 A | * | 12/1981 | Moffitt | 446/47 |
| 2002/0022909 A1 | * | 2/2002 | Karem | 701/3 |
| 2003/0090391 A1 | * | 5/2003 | Philiben et al. | 340/945 |

* cited by examiner

*Primary Examiner* — Daniel Wu
*Assistant Examiner* — Frederick Ott
(74) *Attorney, Agent, or Firm* — Black Lowe & Graham PLLC

(57) ABSTRACT

Systems and methods for anti-collision lights on a UAV. A method for passive anti-collision lights on a Micro-Aerial Vehicle ("MAV") including determining a location of the MAV using a flight management computer configured to fly the MAV on a programmed path using data from a global positioning system and an inertial navigation system. The flight management system transmits light activation data and selectively activates at least one navigation light located on a visible surface of the MAV using the light activation data from the flight management computer.

20 Claims, 9 Drawing Sheets

ANTI-COLLISION LIGHTING SYSTEMS AND METHODS FOR A MICRO AERIAL VEHICLE

GOVERNMENT INTEREST

The invention described herein was made in the performance of work under U.S. Government Contract No. W56HZV-05-C-0724. The Government may have rights to portions of this invention.

BACKGROUND OF THE INVENTION

Aircraft navigation lights are generally located with a red navigation light on the left wingtip leading edge, a green light on the right wingtip leading edge and a white navigation light is as far aft as possible on the tail or each wing tip. High-intensity strobe lights are located on the aircraft to aid in collision avoidance. Navigation lights in civil aviation are required to be operational and to be turned on from sunset to sunrise. High-intensity white strobe lights are part of the anti-collision light system, as well as the aviation red or white rotating beacon. The anti-collision light system (either strobe lights or rotating beacon) is required to be operational and to be turned on for all operating airplanes.

An unmanned, aerial vehicle (UAV), sometimes called an "unmanned, air-reconnaissance vehicle," is an unpiloted aircraft. UAVs can be remote controlled or fly autonomously based on pre-programmed flight plans or more complex dynamic automation systems. UAVs are currently used in a number of military roles, including reconnaissance operations.

The Micro-Aerial Vehicle (MAV) is designed as a ducted fan unmanned air vehicle, and flies like a helicopter (Vertical Take Off and Landing), using a fan that draws in air through a duct to provide lift. The MAV's fan is enclosed in the duct and is generally driven by a gasoline or heavy fuel (kerosene based) engine. The MAV is controlled using Honeywell's® micro-electrical mechanical systems (MEMS) electronic sensor technology. The MAV currently has no dihedrals and, therefore, it is challenging to visually observe and determine which direction a MAV is flying in order to avoid collisions.

Currently there are no requirements for navigation lights for UAVs or MAVs. UAVs are generally large enough to have lights and/or a collision avoidance system. However, as the airspace begins to fill up, when UAV technology is used less for military operations and more for day-to-day police, fire and even news operations there will be an increasing need to avoid collisions. A MAV by necessity is very small and very lightweight for man portability.

SUMMARY OF THE INVENTION

Anti-collision lighting systems and methods for a MAV" are disclosed herein. A method for passive anti-collision lights on a MAV including determining a location of the MAV using a flight management computer configured to fly the MAV on a programmed path using data from a global positioning system and an inertial navigation system is disclosed herein. The flight management system transmits light activation data and selectively activates at least one navigation light located on a visible surface of the MAV using the light activation data from the flight management computer.

A system for passive anti-collision lights on a MAV includes a flight management computer located on the MAV and configured to fly the MAV on a programmed path using data from a global positioning system and an inertial navigation system and configured to transmit light activation data; and at least one navigation light located on a visible surface of the MAV and configured to receive light activation data from the flight management computer.

BRIEF DESCRIPTION OF THE DRAWINGS

The preferred and alternative embodiments of the present invention are described in detail below with reference to the following drawings:

FIGS. 2-1 and 2-2 are views of a ducted fan powered MAV;

FIGS. 4-1-4-11 show a series of possible placements of lights on a MAV.

DETAILED DESCRIPTION OF THE PREFERRED EMBODIMENT

Systems and methods for anti-collision lights on a UAV are disclosed herein. Currently there are no requirements for navigation/anti-collision lights on a UAV, however, because most UAV's are generally shaped like an airplane, at least during daylight operations the vehicle can be seen by other pilots and can be avoided. MAVs, and in particular ducted fan MAVs are not dihedral in shape, can be cylindrical or circular so there is no clear indication of front and back. In fact the airframe is not limited to moving in one direction. Therefore, as shown in one embodiment of the present invention, lightweight lights are used as a passive anti-collision system. More particularly, lights are used at the corners of the aircraft using similar lighting systems as are required for civilian aircraft. Further, in one embodiment of the present invention lights can be selectively altered depending on the direction of travel, the threat level, and the needs of the MAV. For example, each corner of the aerial vehicle may have red, green and white lights. Then depending on the direction of travel, white lights will be activated in the front and rear, green on the starboard and red on the port. By selectively altering the lights, the direction of travel of the MAV can be determined by another pilot or a user on the ground.

Figure 1:
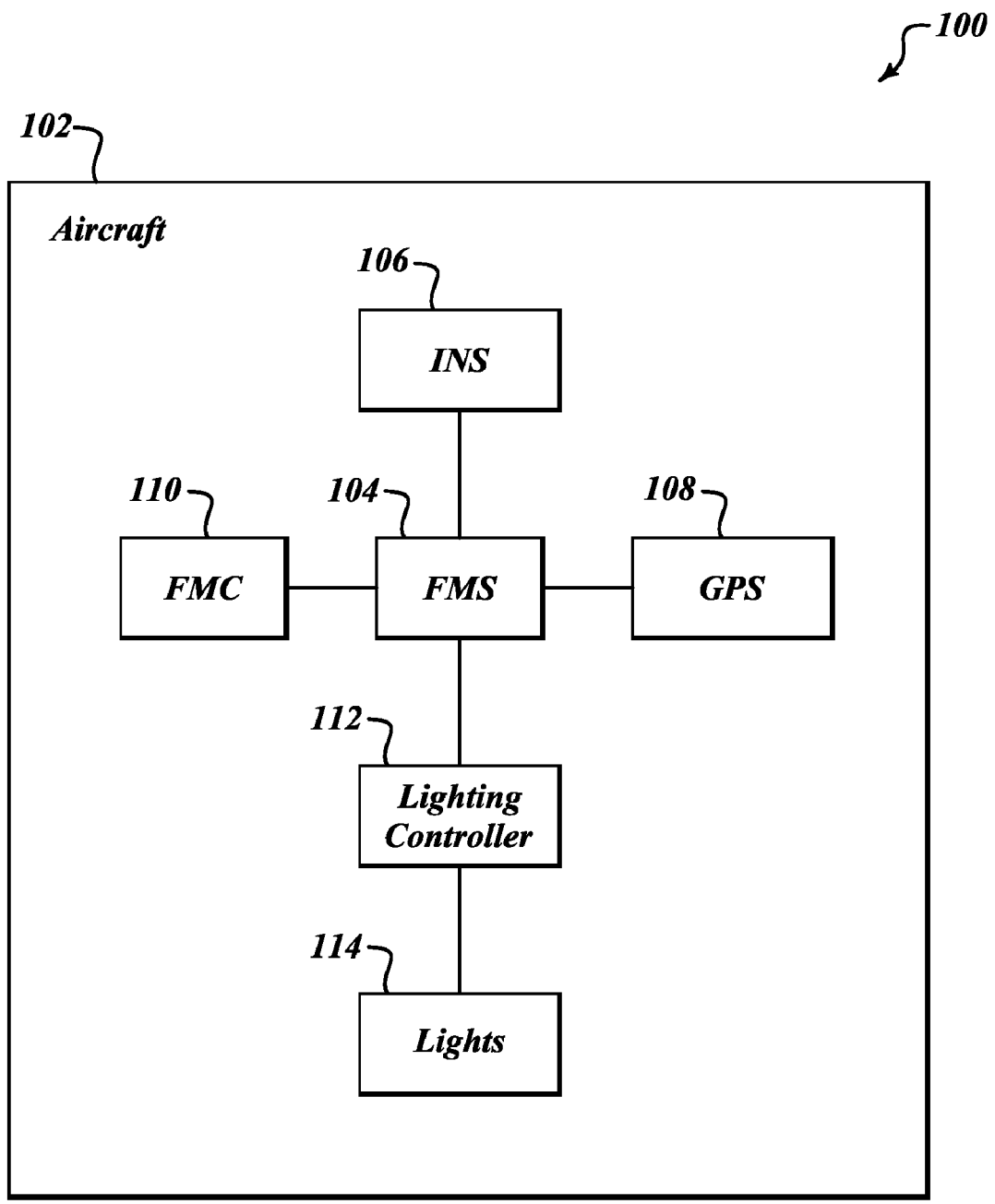
FIG. 1 shows a lighting system for a MAV in one embodiment.

FIG. 1 shows a lighting system for a MAV 102 in one embodiment. The MAV 102 contains a flight management system 104. The flight management system 104 generally includes or is in communication with an inertial navigation system 106 that communicates direction and altitude, a global positioning system 108 that communicates position information and a flight management computer 110, that stores navigation information and coupled with the direction, altitude and current position provides flight commands to the flight management system 104 in order to fly the MAV 102. The flight management computer 110 is also in communication (not shown) with a lighting controller 112 and sends light information containing what lights to activate based on direction of travel, altitude and current position. The lighting controller 112 selectively activates a series of lights 114 on the MAV.

Figures 1, 2:
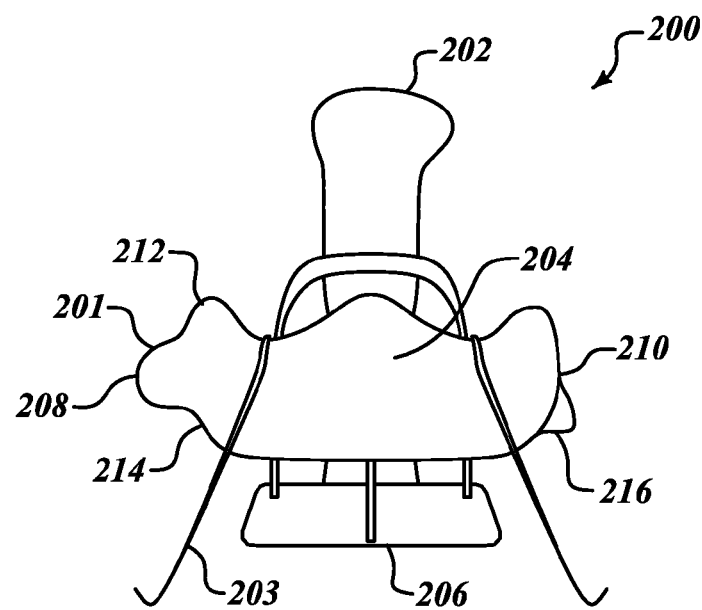
Figure 2:
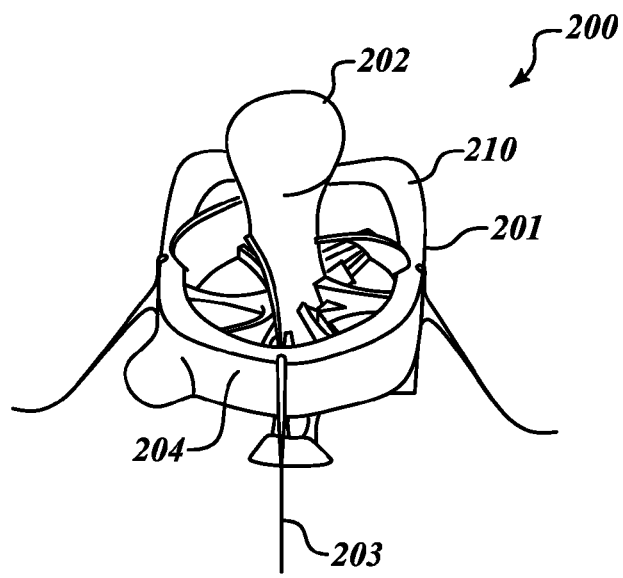

FIGS. 2-1 and 2-2 show a ducted fan-powered MAV 200 having a main body 201, according to one embodiment of the present invention. The MAV 200 contains all of the components as described in FIG. 1. The main body 201 operates as a fan cowling. The MAV 200 has the ability to vertically lift off and land using flexible legs 203 extending from the main body 201. The MAV 200 contains a flight management system (not shown) and at least one light (not shown). As shown the MAV 200 has a top 202, sides, 204 and a bottom 206.

Relative to a camera (not shown) but generally placed at a front 208, the MAV 200 may or may not have a defined front 208 and a rear 210. The sides 204 are connected at corners or high and low points. Alternatively the MAV can be cylindrical or circular without distinct sides or corners. As shown there is a front high 212, and low points shown by a front low point 214 and the rear low point 216. Anyone of these points (surfaces) may have a light device attached. The light device may include visible spectrum high lumen, light emitting diode ("LED") or any other known surface mounted light device, and generally the lights are infrared, colored, and/or white. The lights also are configured to flash as necessary to follow navigation light rules. The lights further can be paired to include different types of lights, for example a colored light paired with an infrared light, such that when necessary the colored light is extinguished and an infrared light is activated. The activation of lights visible only to friendly operators are used to maximize avoidance detection in missions for covert military operations or commercial applications where discreet operation is required day or night. In yet another embodiment multiple lights can be paired such as white, red and green, then depending on the direction of travel, white lights will be activated in the front and rear, green on the right and red on the left. The lights are preferably controlled by the flight management system, in one embodiment using a series of waypoints, configured to transitionally operate in friend or foe conditions.

Figure 3:
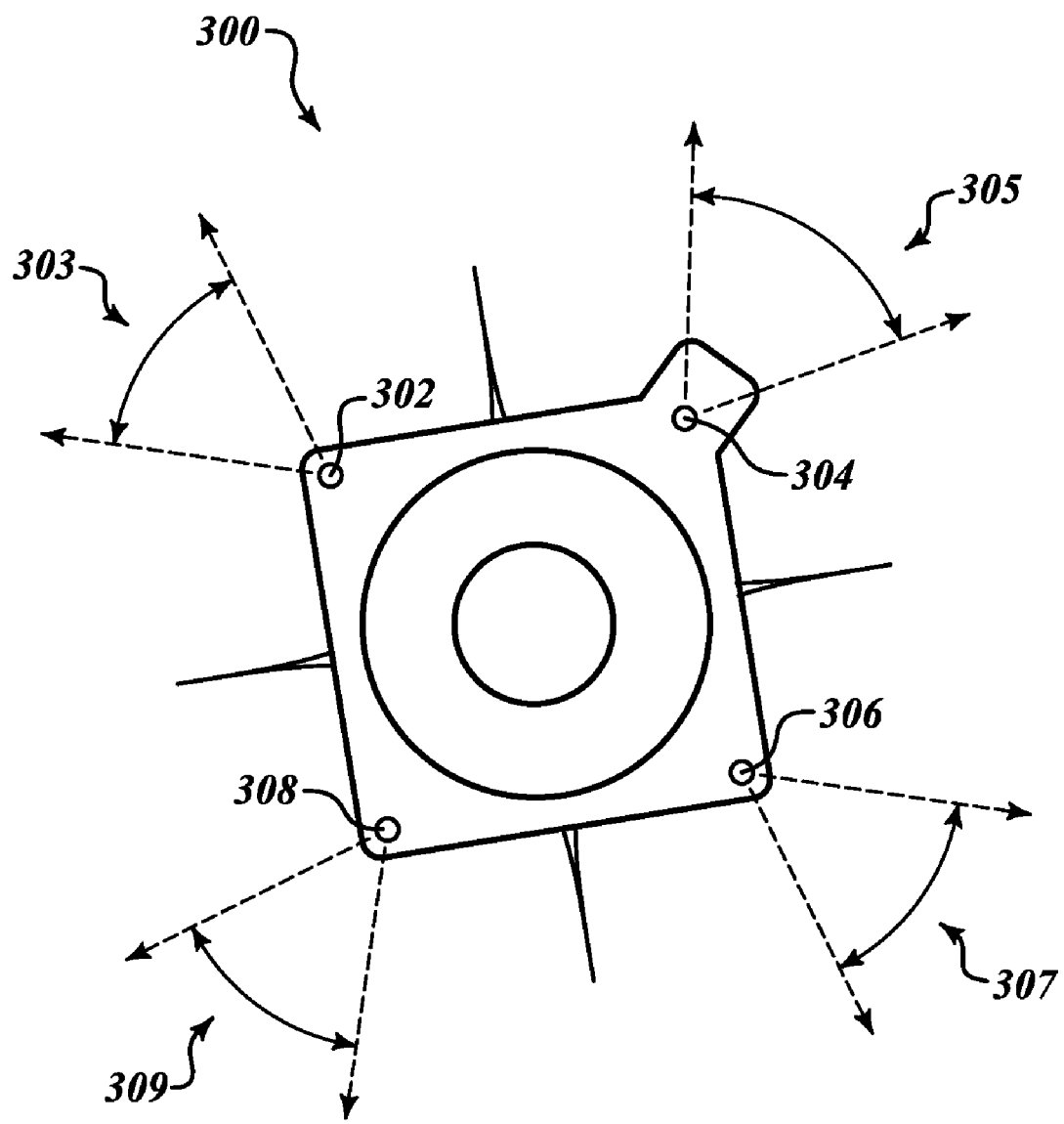
FIG. 3 shows a top view of the MAV, with a four-light configuration.

FIG. 3 shows a top view of a MAV 300, with a four-light configuration. In the four-light configuration flashing lights are placed at a front 302 and a rear 306 of the MAV 300, a green light is placed at a right corner 304 and a red light is placed at a left corner 308 of the MAV 300. Alternatively the MAV can be cylindrical or circular without distinct sides or corners. Each light is configured to be viewed as shown by angles 303, 305, 307 and 309. As shown, this configuration is maintained throughout flight operations no matter which direction the vehicle goes. For example if the corner 308 becomes the front then light 308 becomes white as well as the light 304 at the rear 302 becomes green as it is now the right and light 306 becomes red as it is now on the left.

Figures 1, 4:
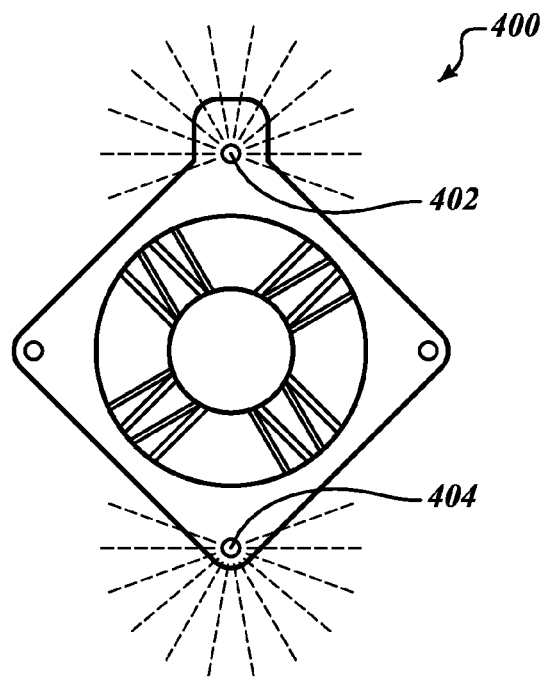
Figures 2, 4:
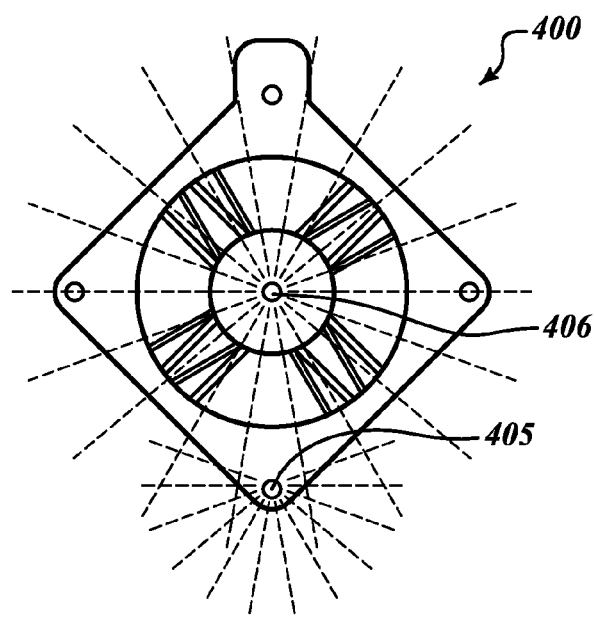
Figures 3, 4:
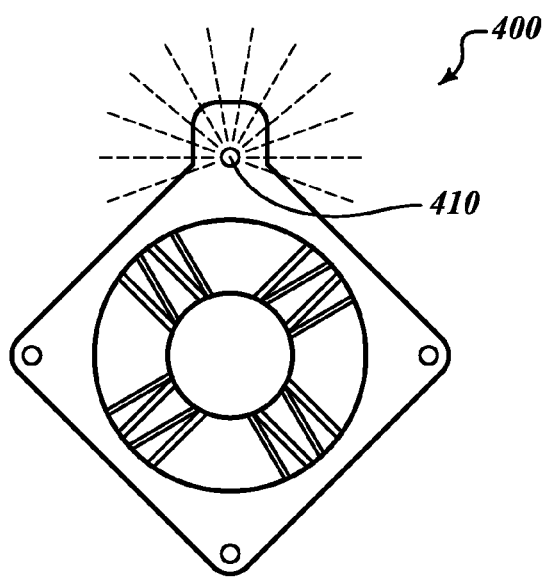
Figure 4:
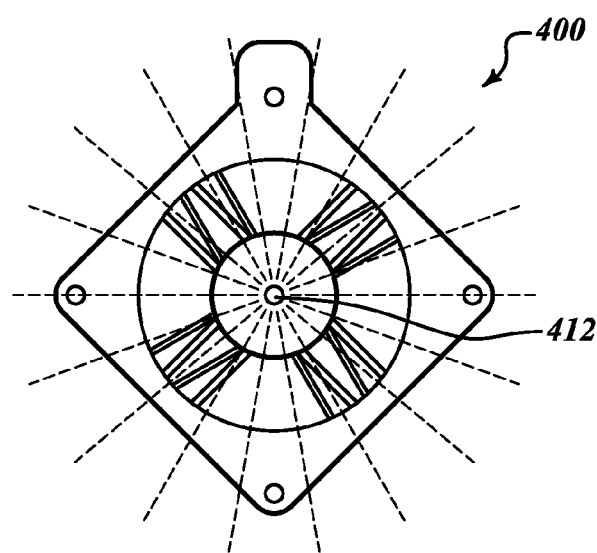

FIGS. 4-1-4-11 show a series of placements of lights on a MAV 400. FIG. 4-1 shows a MAV 400 with a light 402 placed at the front and a light 404 placed at the rear of the MAV 400. FIGS. 4-1-4-11 are shown as multiple embodiments of the invention and illustrate a non-exhaustive plurality of examples of potential light configurations.

FIG. 4-2 shows a MAV 400 with a light 406 placed on the top and a light 408 placed at the rear of the MAV 400.

FIG. 4-3 shows a MAV 400 with a light 410 placed at the front of the MAV 400.

FIG. 4-4 shows a MAV 400 with a light 412 placed on the top of the MAV 400.

Figures 4, 5:
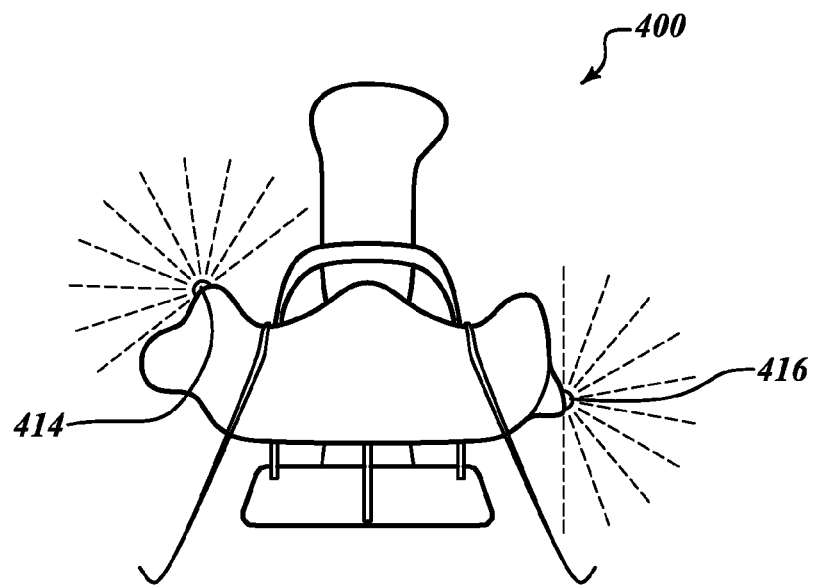

FIG. 4-5 shows a side view of a MAV 400 with a light 414 placed at the front and a light 416 placed at the rear of the MAV 400.

Figures 4, 5, 6:
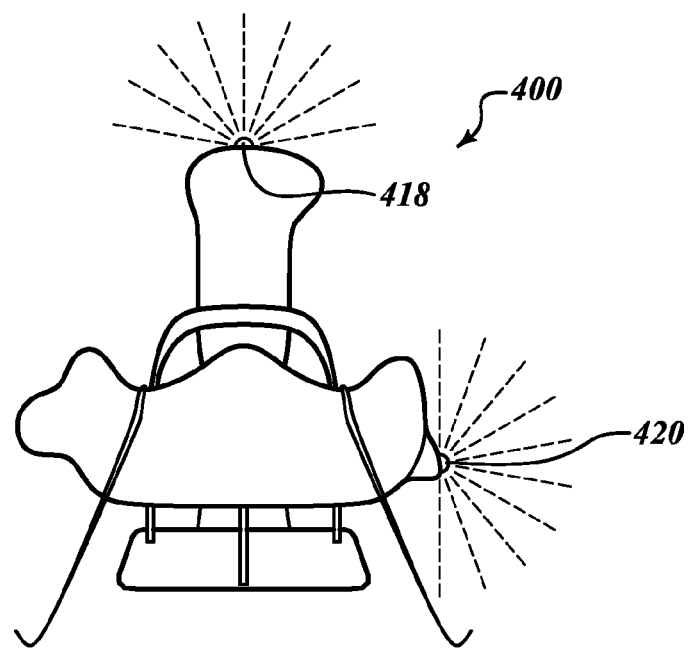
Figures 4, 5, 6, 7:
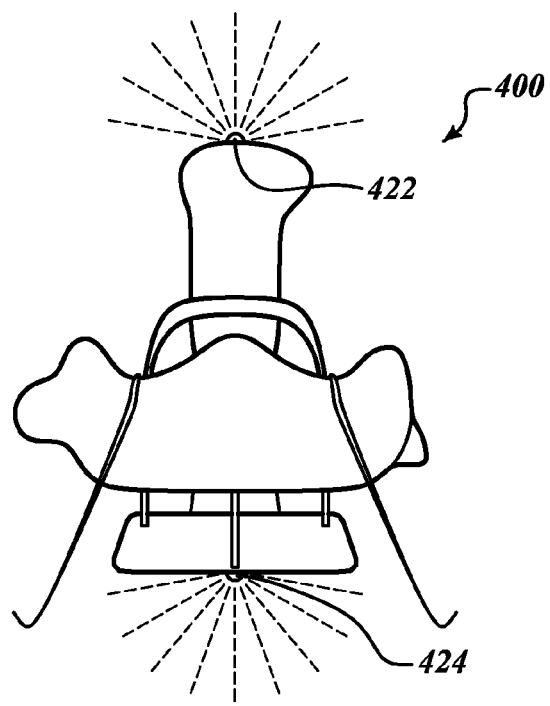
Figures 4, 5, 6, 7, 8:
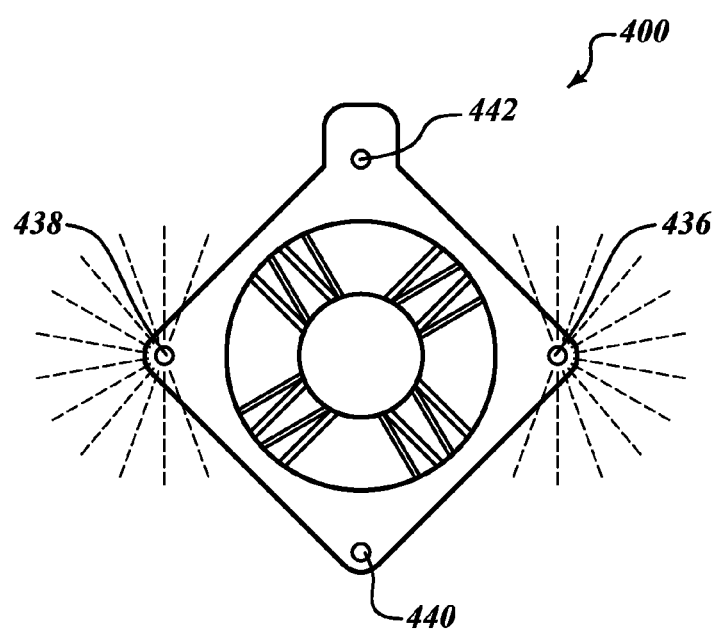
Figures 4, 5, 6, 7, 8, 9:
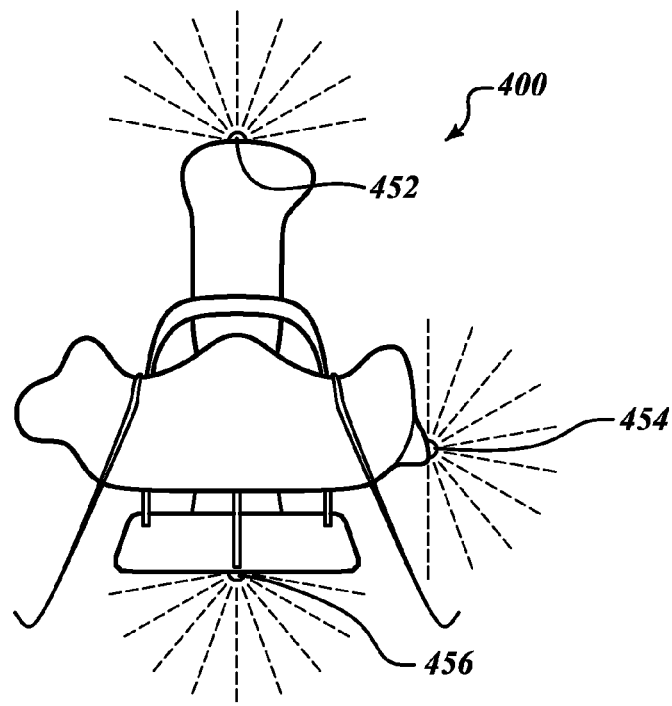
Figures 4, 5, 6, 7, 8, 9, 10:
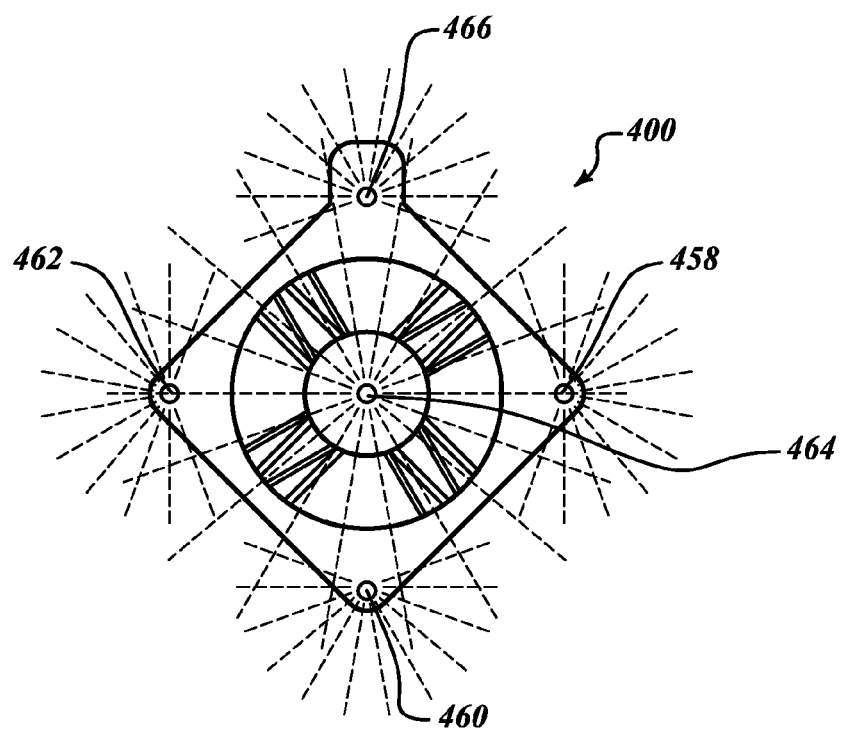
Figures 4, 5, 6, 7, 8, 9, 10, 11:
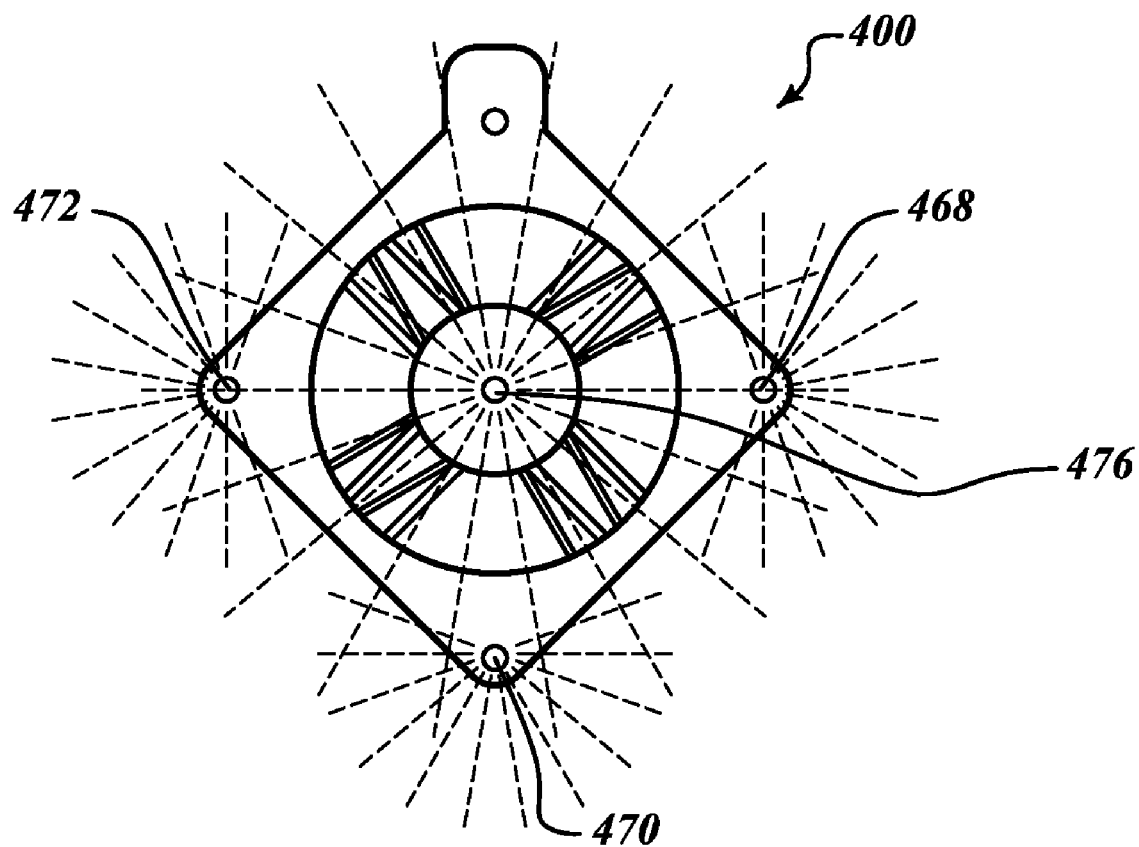

FIG. 4-6 shows a side view of the MAV 400 with a light 418 on the top and a light 420 on the rear of the MAV 400.

FIG. 4-7 shows a side view of the MAV 400 with a light 422 on the top and a light 424 on the bottom of the MAV 400.

FIG. 4-8 shows a four-light configuration of lights on the MAV 400, with lights 436 and 438 illuminated on the sides, and lights 440 and 442 deactivated for daytime usage.

FIG. 4-9 shows a four-light configuration of lights on the MAV 400, with lights 444 and 448 illuminated on the sides, and lights 446 and 450 illuminated on the front and back. In this configuration the lights are preferably different colors, or are configured to flash in the front and back.

FIG. 4-10 shows a MAV 400 having lights 458, 460, 462, and 466 on the sides and light 464 on the top.

FIG. 4-11 shows a MAV 400 having lights 468, 470 and 472 on the sides and rear and light 476 on the top. Other light arrangements are envisioned and the above shown light configuration should not be deemed as restrictive to the invention. For example, multiple light configurations, as well as different colors and lamp types, can be used as one embodiment of the invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A system for passive anti-collision lights on a micro-aerial vehicle comprising:
a plurality of navigation lights located on visible surfaces of the micro-aerial vehicle; and
a flight management computer located on the micro-aerial vehicle and configured to determine direction of travel of the micro-aerial vehicle using data from a global positioning system and an inertial navigation system and configured to adaptively orient an operational configuration of the plurality of navigational lights based on the determined direction of travel.

2. The system of claim 1, wherein two navigation lights are located on opposite sides of the vehicle.

3. The system of claim 1, wherein four navigation lights are located on at least one of the four corners of the vehicle and equally spaced around a cylindrical or circular vehicle.

4. The system of claim 1, wherein a navigation light is located on the top of the vehicle.

5. The system of claim 1, wherein a navigation light is located on the bottom of the vehicle.

6. The system of claim 1, wherein the at least one navigation light is an infrared light.

7. The system of claim 1, wherein the at least one navigation light contains a plurality of colored lights, the colored lights activated separately by the flight management computer.

8. The system of claim 7, wherein the flight management computer selects which of the at least one lights is activated based on the current flight direction of the vehicle.

9. The system of claim 1, wherein the flight management computer selects which of the at least one lights is activated based on pre-programmed flight plan.

10. The system of claim 1, wherein the flight management computer selectively alternates between lights, no lights, and infrared lights based on pre-programmed flight plan.

11. A method for passive anti-collision lights on a micro-aerial vehicle comprising:
determining direction of travel of the micro-aerial vehicle using a flight management computer configured to fly the aerial vehicle using data from a global positioning system and an inertial navigation system; and adaptively orienting an operational configuration of a plurality of navigation lights; based on the determined direction of travel;
wherein selectively activating the plurality of navigation lights located on visible surfaces of the micro-aerial vehicle.

12. The method of claim 11, wherein two navigation lights are located on opposite sides of the vehicle.

13. The method of claim 11, wherein four navigation lights are located on at least one of the four corners of the vehicle and equally spaced around a cylindrical or circular vehicle.

14. The method of claim 11, wherein a navigation light is located on the top of the vehicle.

15. The method of claim 11, wherein a navigation light is located on the bottom of the vehicle.

16. The method of claim 11, wherein the at least one navigation light is an infrared light.

17. The method of claim 11, wherein the at least one navigation light contains a plurality of colored lights, the colored lights activated separately by the flight management computer.

18. The method of claim 17, further comprising activating at least one light with the flight management computer based on the current location of the vehicle in flight.

19. The method of claim 11, further comprising activating at the at least one light based on a pre-programmed light instructions.

20. The method of claim 11, further comprising selectively alternating between lights, no lights, and infrared lights based on pre-programmed instructions.

* * * * *